US008671908B2

(12) United States Patent
Ives et al.

(10) Patent No.: US 8,671,908 B2
(45) Date of Patent: Mar. 18, 2014

(54) GLOW PLUG PLACEMENT IN A DIESEL ENGINE

(75) Inventors: David Curtis Ives, Ann Arbor, MI (US); Brien Lloyd Fulton, West Bloomfield, MI (US); Eric Matthew Kurtz, Dearborn, MI (US); Bradley David Opperman, Belleville, MI (US); Joshua Putman Styron, Canton, MI (US); Patrick Brian Morgan, New Baltimore, MI (US); Martin Johannes Atzwanger, Gleisdorf (AT)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 12/533,373

(22) Filed: Jul. 31, 2009

(65) Prior Publication Data

US 2011/0023819 A1 Feb. 3, 2011

(51) Int. Cl.
*F02B 3/00* (2006.01)
*F23Q 7/00* (2006.01)

(52) U.S. Cl.
USPC .................. 123/298; 123/145 A; 123/305

(58) Field of Classification Search
USPC .............. 123/298–305, 308, 145 A, 145 R
See application file for complete search history.

(56) References Cited

U.S. PATENT DOCUMENTS

| | | | | |
|---|---|---|---|---|
| 4,703,729 A * | 11/1987 | Sakano et al. | ............... | 123/308 |
| 5,207,210 A * | 5/1993 | Yamagata et al. | ............. | 123/661 |
| 5,511,520 A * | 4/1996 | Regueiro | ................... | 123/193.5 |
| 5,676,107 A | 10/1997 | Yuzuriha et al. | | |
| 5,785,028 A * | 7/1998 | Anderson et al. | ........... | 123/193.3 |
| 5,915,353 A * | 6/1999 | Matsumura | .................... | 123/298 |
| 5,960,767 A * | 10/1999 | Akimoto et al. | ............... | 123/298 |
| 6,173,692 B1 * | 1/2001 | Hellmich et al. | ............. | 123/305 |
| 6,223,715 B1 * | 5/2001 | Suzuki | ........................... | 123/294 |
| 6,334,426 B1 * | 1/2002 | Sasaki et al. | ................... | 123/298 |
| 6,460,509 B1 * | 10/2002 | Muramatsu et al. | .......... | 123/305 |
| 6,553,959 B2 * | 4/2003 | Xu et al. | ........................ | 123/295 |
| 6,612,282 B2 * | 9/2003 | Yu | .................................. | 123/262 |
| 6,647,951 B2 | 11/2003 | Shiraishi et al. | | |
| 6,880,520 B2 | 4/2005 | Tanaka et al. | | |
| 7,861,685 B2 * | 1/2011 | Sono et al. | ...................... | 123/298 |
| 2005/0139191 A1 * | 6/2005 | Tanaka et al. | ................. | 123/302 |
| 2007/0246004 A1 | 10/2007 | Matekunas et al. | | |
| 2009/0173312 A1 * | 7/2009 | Nishimoto et al. | ........... | 123/305 |
| 2009/0319156 A1 * | 12/2009 | Fujikawa et al. | ............. | 701/103 |
| 2010/0258078 A1 * | 10/2010 | Ikeya et al. | .................... | 123/305 |

FOREIGN PATENT DOCUMENTS

JP    10169504 A *  6/1998   ............... F02F 1/36

* cited by examiner

*Primary Examiner* — John Kwon
*Assistant Examiner* — Johnny Hoang
(74) *Attorney, Agent, or Firm* — Julia Voutyras; Brooks Kushman P.C.

(57) ABSTRACT

A four-valve per cylinder engine has two intake valves, two exhaust valves and a centrally located fuel injector. Between each adjacent pair of valves is a valve bridge with a point of minimum separation between adjacent valves. In the present disclosure, the glow plug port is defined in the cylinder top at a location outboard of the minimum separation between adjacent and at a depth which is tangent to an edge of a fuel jet emanating the injector. By placing the glow plug farther outboard than found in the prior art, the glow plug contacts the fuel as it comes out of the injector and as it rebounds off a feature of the piston bowl.

15 Claims, 4 Drawing Sheets

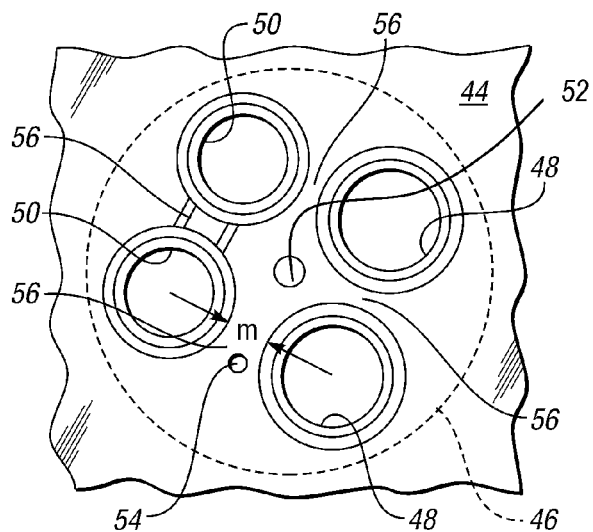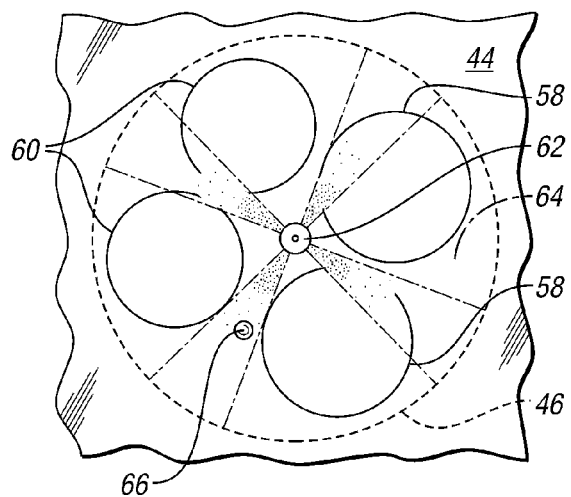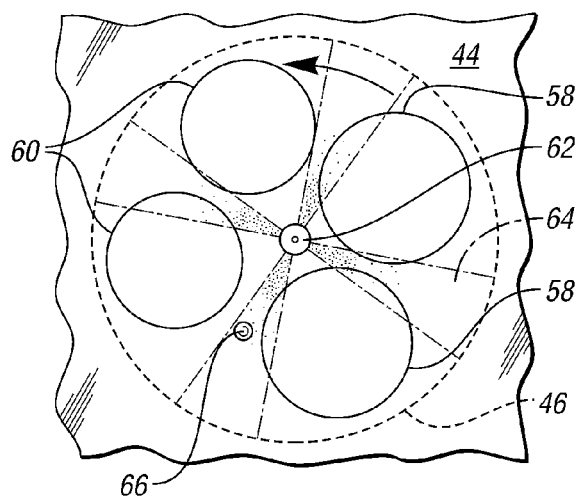

GLOW PLUG PLACEMENT IN A DIESEL ENGINE

BACKGROUND

1. Technical Field

The present disclosure relates to combustion chambers in direct-injection diesel engines.

2. Background Art

Because of the combustion nature of a diesel engine (compression ignition) cold start and cold operation performance are the hardest requirements for a diesel engine. These requirements drive diesel engines to use cold start aids, one such aid is having the combustion chambers of diesel engines equipped with glow plugs to aid cold start performance, thereby minimizing misfire and white smoke (unburned fuel) during operation directly after a cold start. Optimum compression ratios for best efficiency in real world engines occur at a compression ratio of 15 to 1. To further help improve this cold start performance and operation; historically compression ratios of diesel engines were raised to levels much higher than the optimum of 15 to 1 to increase compression temperatures in the cylinder during cold operation. With the advent of lower emissions requirements for engines, one enabler to help engines to meet those lower requirements (particularly NOx) is to lower compression ratios. This increases the importance of glow plugs in diesel engines and requires them to run at hotter temperatures for longer times further emphasizing the importance of placement in relation to the fuel spray in the combustion chamber.

Combustion chambers of diesel engines are equipped with glow plugs to aid cold start performance. A glow plug is typically mounted in the cylinder head with a tip of the glow plug placed tangentially along the outside envelope of a fuel injector spray plume. When a current is provided to the glow plug, the temperature of the glow plug tip heats up and serves as a hot spot or ignition site for fuel vapor which comes in contact with, or in the vicinity of, the tip. Once some of the fuel is ignited, the energy release from the combusting fuel causes a pressure and temperature rise in the cylinder charge in the combustion chamber and aiding in auto-ignition of the remaining fuel throughout the chamber.

Various factors are considered in determining where to place the glow plug in the combustion chamber. The location should be one with the potential for no, or very few, liquid fuel droplets to impact the glow plug tip anytime the engine is operating to ensure full operational life of the glow plug. The glow plug placement also includes operation when the glow plug is not on, to minimize impact on air flow in the vicinity of the glow plug. Also, the glow plug tip is placed in a region of the combustion chamber where the air/fuel ratio is in an appropriate range so that the fuel vapor readily ignites. And, of course, the glow plug is mounted in the cylinder head in a region which is not otherwise occupied by an intake port, an exhaust port, an injector, a sensor, or other component.

A swirl flow is typically induced in the combustion chamber gases to promote mixing and air utilization. The swirl can cause the fuel jets to be displaced from a straight line trajectory. The amount of displacement depends on the operating condition, air flow into the chamber, the fuel injection pressure, i.e., momentum of the fuel spray, and the distance that the spray has traveled from the injector. As mentioned above, it is important to place the glow plug in a location where a suitable air and fuel concentration exists. In the prior art, the glow plug is placed close to the injector nozzle one the side of the fuel spray, at that small radius, the swirl has less influence on the fuel spray location, thus more certainty that the fuel vapor is in contact with the glow plug shortly after an injection commences.

In engines with 4 valves per cylinder, the maximum valve size is partially dictated by having sufficient material between adjacent valves to provide the necessary strength to withstand combustion pressures. In prior art on engines with 4-valve heads, the glow plug is placed near the injector in the valve bridge area (necked region in between adjacent valves), which compromises the strength of the cylinder head. Consequently, the valve sizes are reduced to allow a larger bridge thickness to accommodate the glow plug or the peak combustion pressure that the combustion chamber can withstand is reduced, either of which lowers the maximum power that the engine can develop.

SUMMARY

In one embodiment, a cylinder head has two intake ports and two exhaust ports per cylinder with valve bridges between adjacent ports in each cylinder top or roof. The cylinder top defines a fuel injector port which is centrally located with respect to the intake/exhaust ports and a glow plug port located between an intake port and an exhaust port. One embodiment includes a glow plug port located outboard of a valve bridge between an intake port and adjacent exhaust port. Herein, outboard refers to being located farther away from a center of the cylinder.

A combustion chamber is disclosed which is delimited by a cylinder wall, a cylinder head, and a piston reciprocating within the cylinder wall. The cylinder head has an injector centrally mounted. The injector has a plurality of injector nozzles arranged peripherally around a tip of the injector. When the injector is commanded to open when the piston is near a top center position, fuel jets emanate from the nozzles toward the walls of the piston bowl. The piston bowl has a feature which causes a first portion of the fuel to be directed upwardly toward the cylinder head and then along the cylinder head back toward the injector. A second portion of the fuel is directed downwardly into the piston bowl. A third portion of the fuel is directed upwardly toward the cylinder head and then outwardly toward the cylinder wall. The glow plug is mounted in the cylinder head such that a tip of the glow plug extends into the combustion chamber within a region of vapor formed from the first portion of fuel after redirection by the cylinder bowl feature. According to an embodiment of the present disclosure, a 4-valve-per-cylinder cylinder head has two adjacent intake ports and two adjacent exhaust ports. The injector is centrally mounted. The glow plug is mounted in between two adjacent ports outboard of the minimum thickness portion of the valve bridge between the two adjacent ports. The surface of the piston bowl has a vertical section substantially parallel to the cylinder axis. The tip of the glow plug is located just slightly towards the center of the cylinder with respect to the vertical section. The glow plug is canted such that it comes out of the cylinder head and into the combustion chamber at the location outboard of the minimum separation point between adjacent ports while the tip is inboard of the piston's vertical section. In one embodiment, the glow plug is mounted in between an intake port and an adjacent exhaust port with the glow plug mounted slightly closer to the intake valve, as the metal temperature closer to the intake valve is at a lower temperature, thus less distortion and weakening of the metal in that region. In yet another alternative, the glow plug is mounted in the cylinder head outboard of the valve bridge.

According to an embodiment of the disclosure, the cylinder head strength, and hence the maximum pressure rating of the engine, is not compromised with the glow plug installed outboard of the narrowest point of the valve bridge. A combustion chamber with such orientation of the glow plug develops about 10% higher peak pressure than engines having the glow plug mounted within the valve bridge near the narrowest point of the valve bridge. Similarly, glow plug positioning according to the present disclosure accommodates larger valve diameters relative to prior art configurations with valve diameter constrained by desired strength and glow plug placement. According to the present disclosure, neither valve size nor strength at the valve bridge need be compromised.

The present development can also be applied to an engine having two valves per cylinder. The combustion advantages as well as preventing white smoker during cold operation are both realized. However, because a cylinder head with two valves has space for a glow plug, there is no concomitant advantage of chamber strength by such glow plug placement per the present development.

By placing the glow plug farther outboard in an engine with a particular piston bowl design, the glow plug interacts with the fuel twice, rather than once according to the prior art. With a particular piston bowl, the fuel jets interact with a substantially vertical surface of the combustion bowl causing some of the fuel spray to move upwards toward the cylinder top and some to move downwards into the bowl. Of the fuel moving upwards, some of the fuel moves back inward toward the injector and some of the fuel moves outward toward the cylinder walls. The portion of the fuel that is directed upward and then inward envelops the glow plug. In the glow plug location disclosed, the tip of the glow plug is in the vicinity of the fuel as it traverses the glow plug on a first pass after being injected and then again on the rebound when it is directed by the piston bowl geometry. It has been found that the cold start is improved by the fuel coming into contact with the glow plug twice as opposed to simply once. In the prior art location, the glow plug is so far away from the piston bowl edge, that little fuel travels back to the glow plug location after interacting with the piston bowl edge and the rebounded mixture is too lean to burn. By allowing the glow plug two opportunities to interact with a combustible fuel mixture, cold start performance is improved. In most diesel engines, cold start performance dictates a higher compression ratio than that which yields best efficiency. By improving cold start performance, a slight reduction in compression ratio is possible thereby increasing fuel efficiency.

In a twisted-port engine with intake swirl, there is a concern that by putting the glow plug outboard of the minimum separation of the valve bridge that the fuel jet bound for the glow plug would be displaced sufficiently that the glow plug would no longer be near a combustible mixture of the fuel jet. However, in one application, this was not found to be a problem, even though as much as 10 degrees of angular rotation was experienced at some operating conditions (about only 5 degrees of rotation at the distance of the glow plug from the central axis). And, as mentioned above, appropriate placement of the glow plug near the path of the fuel jet emitted from the injector and redirected by the piston bowl affords two opportunities for the glow plug to heat and ignite fuel.

Typical diesel fuel injectors spray liquid fuel out of multiple nozzles at high pressure into hot air in the combustion chamber. Because the pressure drop across the injector nozzles is high, the liquid fuel is injected at high velocity causing the fuel to atomize into very fine droplets and to entrain air as it travels from the injector toward the cylinder walls. Because of the high temperature of the compressed gases in the cylinder, the small droplet size, and the mixing with the air, the droplets rapidly vaporize so that before the fuel jet travels to the cylinder walls, the jet is a mixture of fuel vapor and air with no droplets remaining. Thus, yet another advantage of placing the glow plug farther away from the injector than customary in the prior art is that it is even less likely that a liquid droplet impacts the glow plug.

U.S. 2007/0246004 A1 describes an engine combustion system which has a glow plug mounted at a peripheral location. However, this combustion system is quite different than a typical diesel combustion system in a number of ways. The piston top is flat, i.e., lacking a piston bowl. The combustion chamber volume is contained in the cylinder head, with U.S. 2007/0246004 A1 having a hemispherical head. Furthermore, the glow plug does not protrude into the combustion chamber and is mounted at an angle which is obtuse with respect to the cylinder axis (or the injector). This is in contrast with a typical diesel combustion system which has: the majority of the combustion chamber volume (at top center of piston travel) is within the piston bowl, a flat cylinder top, a glow plug protruding into the combustion chamber, and the glow plug mounted at an acute angle with respect to the cylinder axis.

BRIEF DESCRIPTION OF THE DRAWINGS

FIG. 3 is a plan view of a portion of the cylinder head having a glow plug positioned according to one embodiment of the present disclosure;

FIGS. 4A and 4B are plan views of a portion of the cylinder head showing the impact of swirl flow on fuel jets in a cylinder having a glow plug positioned according to one embodiment of the present disclosure.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate to placement of a glow plug in a 4-valve-per-cylinder engine that is outboard of the narrowest section of the valve bridge in between adjacent valves. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

Figure 1:
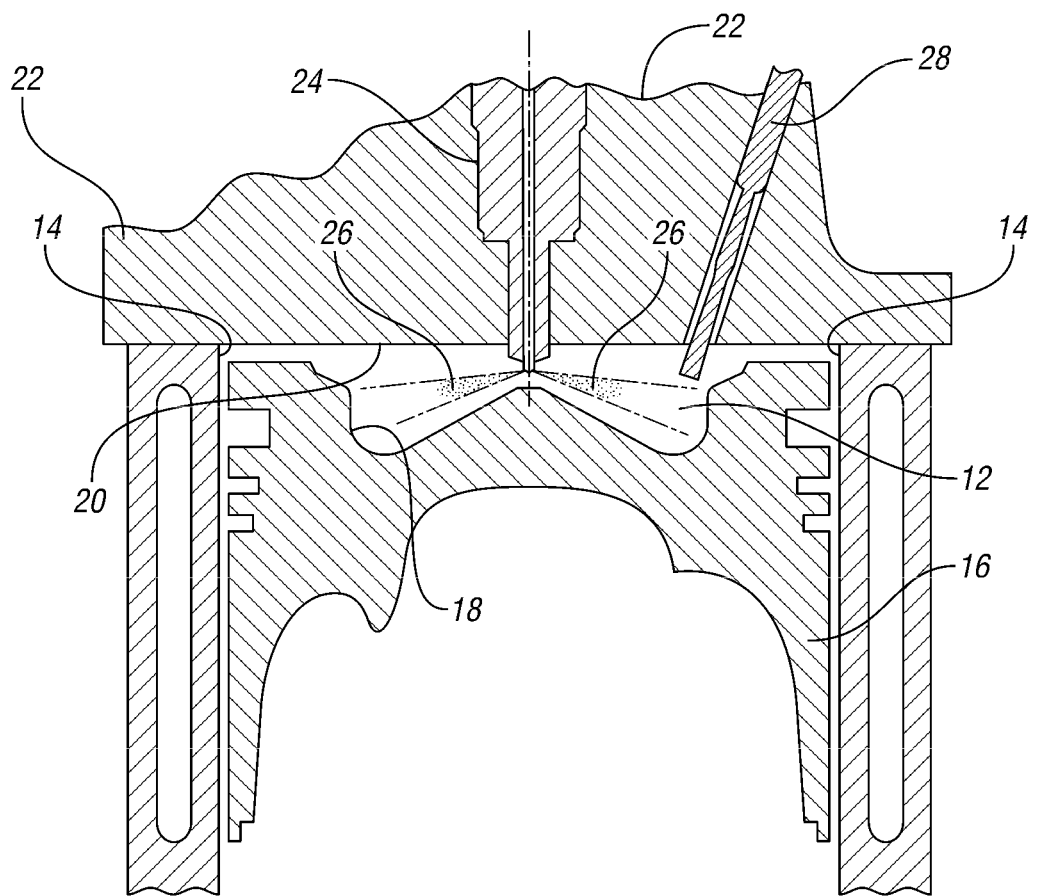
FIG. 1 is a cross section of a combustion chamber and cylinder of an internal combustion engine with glow plug placement according to one embodiment of the present disclosure.

In FIG. 1, a cross section of a portion of an engine is shown in which a combustion chamber 12 is delimited by cylinder walls 14 with a cooling jacket therein. A piston 16 reciprocates within cylinder walls 14. Piston 16 has multiple grooves for rings (not shown) and a cylindrical aperture traversing through it to accommodate a wrist pin (not shown). The top of piston 16 has a piston bowl 18. The shape of piston bowl 18 is instrumental in obtaining the desired combustion and emission characteristics of the engine which result from how fuel jets interact with piston bowl 18 to effectively utilize the air in the cylinder and control combustion. Combustion chamber 12 is further delimited by cylinder top 20, which is a portion of cylinder head 22. Cylinder top 20, herein, is the portion of cylinder head 22 which delimits combustion chamber 12, i.e., that which covers cylinder wall 14. The surface of cylinder top 20 which faces piston 16 is called a combustion surface herein. As shown in FIG. 1, the combustion surface is substantially flat and generally perpendicular with respect to an axis of a fuel injector 24 which is mounted centrally in cylinder head 22. Fuel injector 24 has a plurality of orifices around a tip protruding into combustion chamber 12, from which fuel jets 26 emanate. They may form a solid cone of angle, x, which is typically an obtuse angle. The typical number of fuel jets is eight. However, injectors may have more or fewer jets. Typically, they are evenly spaced around the periphery of the tip of injector 24, although they can be staggered or multiple holes can be grouped together. A tip of glow plug 28 is arranged so that it is tangent to an edge of one of the fuel jets 26. Combustion chamber 12 is supplied fresh air through at least one intake valve and combusted gases are expelled through at least one exhaust valve. However, these are not shown in the cross section depicted in FIG. 1 because the cross section is taken in between valves.

Fuel injector 24 sprays liquid fuel into combustion chamber 12 at very high velocity causing the fuel to break up into a cloud of fine droplets. Because the fuel is injected into hot, compressed gases at very high velocity, the fuel entrains air and quickly vaporizes. The fuel jet, closer the injector, is a mixture of small liquid droplets, vaporized fuel, and some entrained air. As the fuel jet travels across the chamber, the droplets are largely vaporized and the fuel jet contains fuel vapor and more entrained air. By the time the fuel jet reaches the cylinder wall or the piston bowl, the fuel is completely vaporized. Fuel jet, herein, refers to the fuel vapor, fuel droplet, and entrained air cloud moving away from injector 24 at high velocity.

Figure 2A:
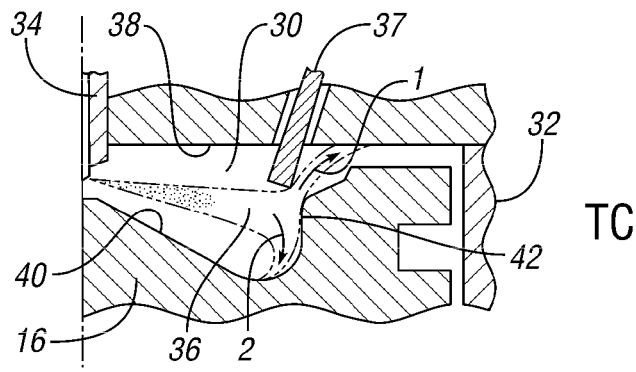
FIGS. 2A-C are cross-sectional views of half of the combustion chamber showing the movement of fuel sprays at three positions of the piston during the expansion stroke in a cylinder having a glow plug positioned according to one embodiment of the present disclosure.

Referring now to FIG. 2A, half of a combustion chamber 30 is shown with a fuel injector 34 along a central axis of cylinder walls 32 and piston 16 at top center (uppermost) position with piston bowl 40 closest to cylinder top 38. Injector 34 sprays fuel out of nozzles at a periphery of its tip, with one of such fuel jets 36 depicted in FIG. 2A. Combustion chamber 30 is delimited by cylinder walls 32, cylinder top 38 and piston bowl 40. In FIG. 2A, fuel jet 36 has droplets existing near injector 34 that decrease in size and number as fuel jet 36 travels further away from injector 34, allowing more time for vaporization. A glow plug 37 is mounted in cylinder top 38 at a location more than halfway outboard relative to the cylinder axis according to an embodiment of the present disclosure. Glow plug 37 is mounted deep enough into combustion chamber 30 so that its tip is tangent to fuel jet 36 as it emanates from injector 34. A portion of fuel jet 36 farthest away from injector 34 interacts with a surface of piston bowl 40 directing a first portion 1 of the fuel upward toward cylinder top 38 and directing a second portion 2 of the fuel downward into piston bowl 40.

Figure 2B:
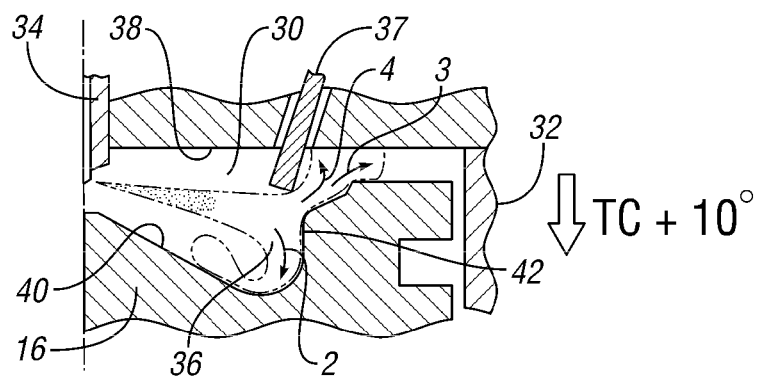

Referring now to FIG. 2B, which is at 10 degrees after top center, piston 16 has moved downward such that combustion chamber 30 has a larger volume than in FIG. 2A. Fuel jet 36 continues to disperse with the second portion 2 traveling downward into piston bowl 40 and curling back around in a clockwise direction first toward the bottom of piston bowl 40 and then back toward injector 34. The first portion of fuel jet 36 (denoted by an arrow labeled 1 in FIG. 2A) which was shown traveling upward toward the cylinder top 38 in FIG. 2A, splits in FIG. 2B, with a third portion 3 traveling outwardly toward cylinder wall 32 and a fourth portion 4 traveling inwardly along the cylinder top toward injector 34. The later phase of fuel jet 36 still being injected from injector 34 is tangent with glow plug 37.

Figure 2C:
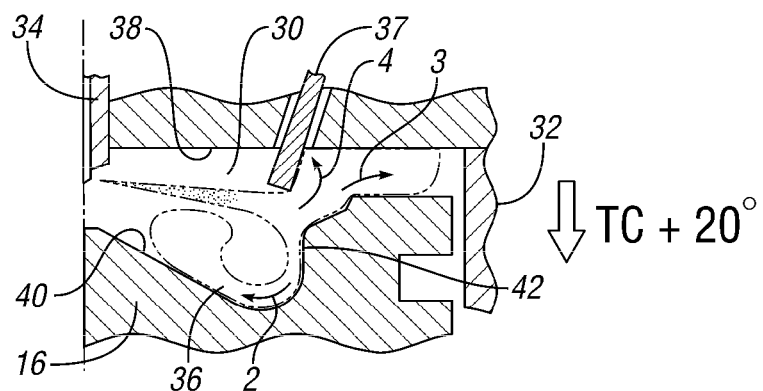

Referring to FIG. 2C at 20 degrees after top center, the piston has retreated as compared to that shown in FIGS. 2A and 2B and fuel flow from fuel injector 34 has stopped. Fuel moving in piston bowl 40 continues to wrap back toward the center of combustion chamber 30. Part of the fuel moving upwardly moves out farther toward cylinder wall 32 thereby interacting with air in the periphery of the combustion chamber. The fourth portion 4 of the fuel moving first upwardly and then inwardly is shown in FIG. 2C enveloping glow plug 37. Glow plug 37 is tangent to fuel coming out of injector 34 as well as being surrounded by a fuel cloud rebounding back toward injector 34 after interacting with piston bowl 40.

The illustrations of a fuel jet in FIGS. 2A-C are provided as one example. When the fuel injection event is short, the fuel injection may stop prior to the tip of the fuel jet reaching the glow plug. Also, the fuel injection can be initiated earlier than what is shown in FIGS. 2A-C such that much of the fuel is injected prior to the piston attaining top center. Or, if the injection is phased later, the piston retreats further before the fuel jet reaches the piston bowl and the interaction of the fuel jet with the glow plug is slightly different than what is shown.

In FIGS. 2A-C, piston bowl 40 has a portion 42 which is substantially vertical. This feature helps to deflect the fuel upwardly and then inwardly toward glow plug 37. The tip of glow plug 37 is inboard of the vertical portion 42 of piston bowl 40. This ensures that the piston does not impact glow plug 37 at top center. In one embodiment, glow plug 37 is canted such that it is mounted into cylinder top 38 farther outboard than the tip of glow plug 37 which points slightly toward the center of the axis of combustion chamber 30. As shown in FIGS. 2A-C, a substantial portion of piston bowl 40 is included in vertical portion 42. Other piston bowls may be rounded with a very short vertical section or simply a point (as viewed in cross section) where the slope of the curve is switching from positive to negative.

In FIG. 3, a plan view of a portion of cylinder head 44 from an underside (within the cylinder) is shown. The portion of cylinder head 44 which forms a cylinder top 46 is denoted by dashed lines. The dashed line circle sits over the cylinder walls when assembled. Two adjacent intake ports 48 and two adjacent exhaust ports 50 are defined in cylinder head 44. It is common to refer to ports as being the passages leading through the cylinder head. However, in the present discussion, ports refer to the openings formed in cylinder top 46. A centrally-located fuel injector port 52 and an outboard glow plug port 54 are also defined in cylinder head 44. In between each pair of adjacent ports is a valve bridge 56. Cylinder heads have a hollow portion inside through which a coolant flows to keep the metal temperatures below their melting point. In between adjacent valves, a cooling jacket cannot be provided because it is important to cast a solid portion to provide support for the valve seats in that location. The distance, m, shown in FIG. 3, is measured at the point of minimum separation between a pair of adjacent ports. In the prior art, the glow plug is mounted in a valve bridge at the point of minimum separation or inboard relative to this point. According to the present disclosure, glow plug port 54 is placed outboard of the minimum width of the valve bridge 56 between adjacent valves. Valve bridges 56 in between adjacent valves only exist along a certain length of the adjacent valves. A coolant jacket, however, is provided on both ends of valve bridges 56. In an alternate configuration, glow plug port 54 goes through the coolant jacket outboard of one of valve bridges 56.

As shown in FIG. 3, ports 48 and 50 are oriented to facilitate operation of the four valves, which are mounted into ports 48 and 50 upon assembly, by a single camshaft. Alternatively a double camshaft cylinder head can be used. Glow plug port 54 is shown in between one of the intake ports 48 and one of the exhaust ports 50. However, any adjacent port pair could be used. In the illustrated embodiment, glow plug port 54 is positioned closer to one intake port because the metal temperature at such location during engine operation is generally lower than the metal temperature nearer the exhaust ports.

A plan view of a portion of cylinder head 44 (from an underside, i.e., within the cylinder) is shown in FIG. 4A in which intake valves 58 and exhaust valves 60 are installed into the intake and exhaust ports, respectively. Injector 62 is mounted centrally with four fuel jets 64 emanating from orifices in the injector tip. Fuel jets 64 have droplets close to injector 62, but only gaseous fuel further away from injector 62. In FIG. 4A, a quiescent chamber is shown in which fuel jets 64 are not displaced. One of fuel jets 64 passes tangent with a tip glow plug 66.

In FIG. 4B, a counter-clockwise swirling flow is shown thereby displacing fuel jets 64. Fuel jets 64 are displaced with respect to glow plug 66, with particular concern about the fuel jet specifically targeted to be tangent to glow plug 66. It has been found experimentally that such displacement of the fuel jet with respect to glow plug 66 does not negatively impact cold start performance. Although the fuel jet may, depending on operating condition, be displaced as much as 10 degrees at the periphery of the cylinder, the maximum displacement at the position of glow plug 66 is only about 5 degrees, since glow plug 66 is mounted approximately half-way out from the center of the cylinder, i.e., injector 62 position. In FIG. 4B, the fuel spray is shown rotated 10 degrees; however, the shape of the fuel jet may be impacted differently as a function of distance from the center.

The present development can be applied to engines with 2 valves per cylinder. In such engines, the injector is generally centrally mounted, but displaced from the center slightly. Also, it is typical, in 2-valve engines, for the injector to be installed at an angle, in the range of 10 to 30 degrees. Nevertheless, the glow plug, per an embodiment of the present disclosure, can be placed at a position that is closer to the periphery of the cylinder than the center of the cylinder such that a piston bowl of the type described above, can cause the fuel to contact the glow plug as it is injected from the injector and on the rebound from the piston bowl.

Figure 5:
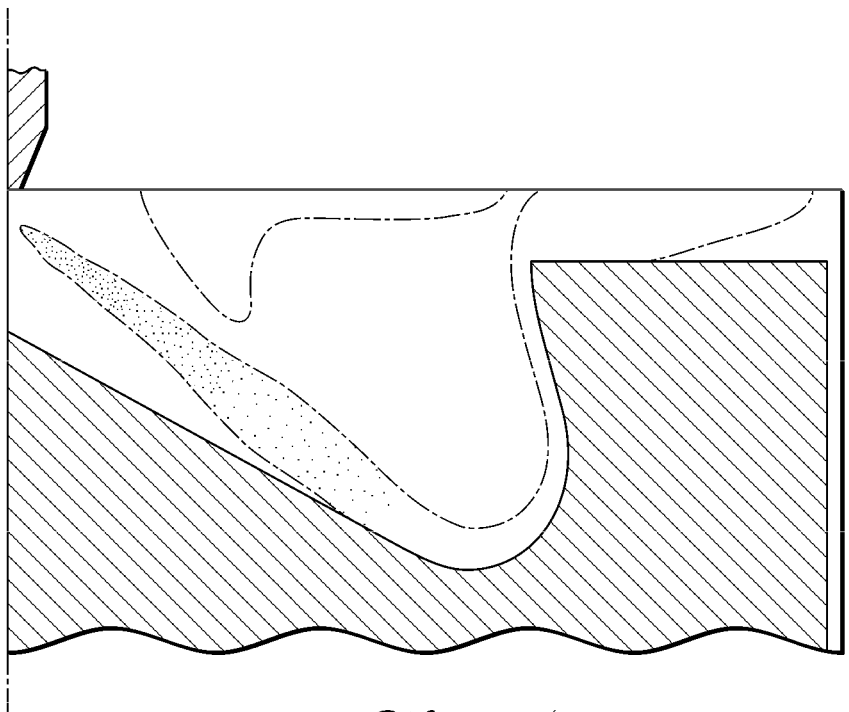
FIGS. 5 and 6 are cross sectional views showing spray interaction with combustion chambers according to embodiments of the present disclosure.
Figure 6:
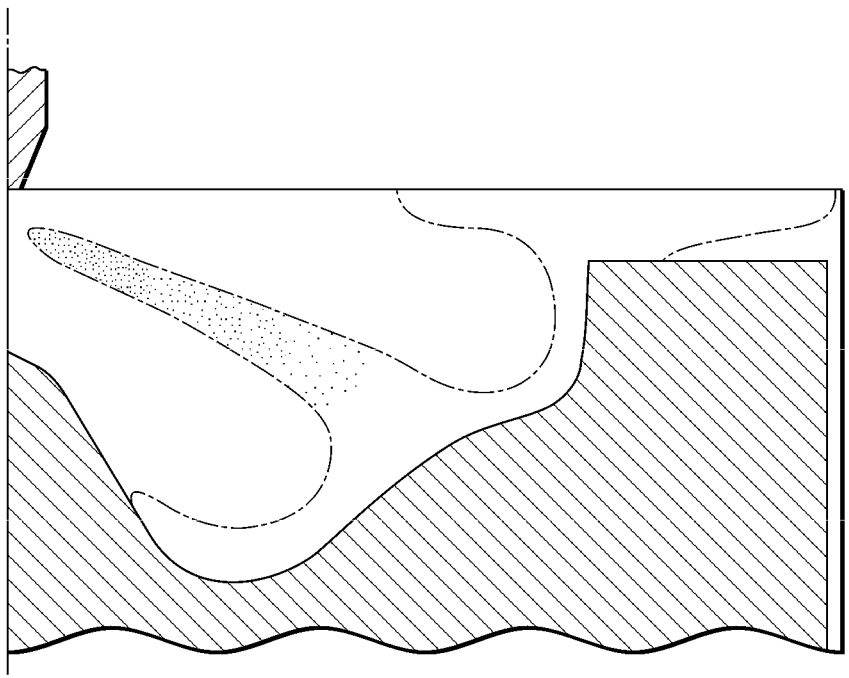

In FIGS. 5 and 6, other piston bowl shapes that can be used in conjunction with the glow plug placement according to an embodiment of the present disclosure are shown. In one example, a narrow cone fuel spray is utilized with these piston bowl shapes, e.g., a 120 degree included angle as compared with a 150 degree included angle shown in the example shown in FIG. 1. In such a situation, a glow plug placement which is more than halfway out from the center of the cylinder provides the structural advantages for a 4-valve per cylinder head, i.e., putting the glow plug outboard of the minimum spacing between valves where the glow plug can be accommodated without serious reduction in strength. However, finding a depth of the glow plug to be proximate to fuel rebounding from the piston bowl as well as proximate the fuel jet as it leaves the injector may be more difficult with a narrow spray cone angle injector.

As such, embodiments of the present disclosure improve cold start performance by placing the glow plugs farther outboard (displaced from the center of the cylinder toward the cylinder walls) relative to the cylinder axis while using a fuel injector spray pattern in combination with a piston bowl to facilitate interaction between the glow plug and fuel twice for each injection. In particular, various embodiments of the present disclosure position the tip of the glow plug in the vicinity of the fuel as it traverses the glow plug on a first pass after being injected and then again on the rebound when it is redirected by the piston bowl geometry. Furthermore, glow plug positioning outboard of the valve bridge facilitates larger intake/exhaust ports without compromising cylinder top strength, which accommodates higher cylinder pressures that are also associated with improved cold start performance and improved fuel efficiency.

While the best mode has been described in detail, those familiar with the art will recognize various alternative designs and embodiments within the scope of the following claims. For example the piston bowl shown in FIGS. 2A-C is simply an example and not intended to be limiting. An advantage described for the exemplary piston bowl is that it causes fuel to rebound back toward the glow plug. The present disclosure is advantageous even with piston bowl/injector combinations in which such rebound of fuel enveloping the glow plug does not occur. The present disclosure can be used in combustion systems with and without swirl. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A multiple-cylinder engine comprising:
   a cylinder head having a plurality of substantially flat cylinder tops with each cylinder top including: a substantially centrally located fuel injector with multiple nozzle orifices;
   two intake ports;
   two exhaust ports; and
   a glow plug mounting orifice located between an intake port and an exhaust port closer to the intake port than the exhaust port and outboard from a minimum separation location between the intake and the exhaust ports.

2. The engine of claim 1 wherein a combustion surface of the cylinder top is adapted to mount on an engine cylinder and the fuel injector orifice is substantially perpendicular to the combustion surface.

3. The engine of claim 2 wherein the glow plug orifice is at an acute angle with respect to the fuel injector orifice with an end of the glow plug orifice traversing through the combustion surface being closer to a centerline of the fuel injector orifice than the other end of the glow plug orifice.

4. An internal combustion engine having a combustion chamber delimited by a cylinder wall, a cylinder top affixed to a first end of the cylinder, and a piston reciprocating within the cylinder wall, the piston having a piston bowl on an end of the piston facing towards the cylinder top, the engine comprising:
- a fuel injector substantially centrally mounted in the cylinder top, the injector having a plurality of injector nozzle orifices arranged peripherally around a tip of the injector, the nozzles adapted to spray a plurality of fuel jets toward the cylinder wall wherein when a fuel injection occurs with the piston being near top center, the fuel jets are directed toward a feature of the piston bowl causing a portion of the fuel jet to be directed upward toward the cylinder top and then along the cylinder top toward the injector; and
- a glow plug mounted in the cylinder top between an intake port and an exhaust port, beyond a minimum separation location between the intake and the exhaust ports and closer to the intake port than the exhaust port, wherein the tip of the glow plug extends into the combustion chamber into a region where one of the fuel jets has been directed upward by the piston bowl along the cylinder top toward the injector.

5. The combustion chamber of claim 4 wherein the mounting of the glow plug is additionally determined so that the tip of the glow plug is tangent an edge of the fuel jet prior to the fuel jet being directed upward by the piston feature.

6. The combustion chamber of claim 4 wherein the tip of the glow plug is adjacent or proximate the fuel jet on a surface of the fuel jet closest to the cylinder top.

7. The engine of claim 4 wherein each cylinder wall has a cylinder diameter and the glow plug is mounted in the cylinder top outboard from the injector axis at least one-half of the diameter.

8. The engine of claim 4 wherein a surface portion of the piston bowl is substantially parallel to an axis of the cylinder and the tip of the glow plug is located at a diametrical location nearer the surface portion than the axis of the cylinder.

9. The engine of claim 4, further comprising:
- two intake ports defined in the cylinder top, the two intake ports being adjacent to each other;
- two exhaust ports defined in the cylinder top, the two exhaust ports being adjacent to each other; and
- four valve bridges, one being located between each pair of adjacent ports wherein the injector is oriented such that one of the fuel jets travels proximate one of the valve bridges and the glow plug is located outboard of the one valve bridge.

10. An internal combustion engine having a combustion chamber delimited by a cylinder wall, a cylinder top affixed to a first end of the cylinder, and a piston reciprocating within the cylinder wall, the cylinder top having two adjacent intake ports and two adjacent exhaust ports with valve bridges in between each adjacent port pair with each valve bridge having a minimum thickness point where there is minimum separation between adjacent ports, wherein the piston has a piston bowl on a piston surface facing towards the cylinder top with a vertical portion of the piston bowl being substantially parallel to an axis of the cylinder wall, the engine comprising:
- a fuel injector mounted in the cylinder top with a tip of the injector located substantially coincident with the cylinder axis; and
- a glow plug mounted in the cylinder top outboard of the minimum thickness point of one of the valve bridges located between an intake port and an exhaust port, farther from the fuel injector orifice than the minimum thickness point of one of the valve bridges, and closer to the intake port than the exhaust port.

11. The engine of claim 10 wherein a tip of the glow plug is located inboard of the vertical portion of the piston bowl.

12. The engine of claim 10 wherein the injector is oriented so that one of the plurality of fuel jets travels in the vicinity of the one valve bridge proximate the glow plug.

13. The engine of claim 10 wherein the fuel injector has a plurality of orifices adapted to spray fuel jets intermittently into the combustion chamber, the fuel jets form a cone with an obtuse included angle.

14. The engine of claim 10 wherein the glow plug is placed at a depth such that a tip of the glow plug is tangent to one of the plurality of fuel jets emanating from the injector.

15. The engine chamber of claim 10 wherein the vertical portion of the piston bowl interacts with a fuel jet to cause a portion of the fuel jet to be directed upwardly toward the cylinder top and then radially inwardly along the cylinder top toward the cylinder axis and the glow plug is placed at a depth such that the tip is enveloped by the fuel jet directed upwardly toward the cylinder top and then radially inwardly along the cylinder top.

* * * * *